United States Patent [19]

Swift et al.

[11] 4,409,399

[45] Oct. 11, 1983

[54] PROCESS FOR PRODUCING ALIPHATIC AMINES

[75] Inventors: Harold E. Swift, Gibsonia; Robert A. Innes; Anatoli Onopchenko, both of Monroeville, all of Pa.

[73] Assignee: Millmaster Onyx Group, Inc., New York, N.Y.

[21] Appl. No.: 328,639

[22] Filed: Dec. 9, 1981

[51] Int. Cl.³ .................... C07C 85/06; C07C 85/08
[52] U.S. Cl. .................................... 564/473; 564/480
[58] Field of Search .............................. 564/473, 480

[56] References Cited

U.S. PATENT DOCUMENTS

| | | | |
|---|---|---|---|
| 2,609,394 | 9/1952 | Davies et al. | 564/473 X |
| 2,636,902 | 4/1953 | Taylor et al. | 564/473 X |
| 2,848,495 | 8/1958 | Villemey | 564/473 X |
| 3,520,933 | 7/1970 | Adam et al. | 564/480 X |
| 3,832,402 | 8/1974 | Yeakey | 564/480 X |
| 3,976,697 | 8/1976 | Kuntschik et al. | 564/473 X |
| 4,036,883 | 7/1977 | Voges et al. | 564/480 |
| 4,078,003 | 3/1978 | Feichtinger et al. | 564/473 X |
| 4,210,605 | 7/1980 | Hoshino et al. | 564/473 |
| 4,254,060 | 3/1981 | Kimura et al. | 564/480 X |

*Primary Examiner*—Paul F. Shaver
*Attorney, Agent, or Firm*—Arthur A. Jacobs

[57] ABSTRACT

A process for producing aliphatic amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide (2) nickel oxide or nickel hydroxide, and, optionally, (3) an oxide or an hydroxide of a Group II A metal.

39 Claims, No Drawings

PROCESS FOR PRODUCING ALIPHATIC AMINES

BACKGROUND OF THE INVENTION

1. Field of the Invention

This invention relates to a process for producing aliphatic amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide, (2) nickel oxide or nickel hydroxide and, optionally, (3) an oxide or a hydroxide of a Group II A metal.

2. Description of the Prior Art

The liquid phase amination of long-chain alcohols and aldehydes with ammonia, primary amines or secondary amines is known. The use of copper or nickel catalysts for this reaction is known. Thus, copper has been used as cupric oxide on a refractory support or as a copper chromite catalyst. References such as U.S. Pat. No. 2,160,058 to Covert and French Pat. No. 780,028 disclose the use of copper oxide supported on alumina or silica gel. These references also disclose the use of copper barium chromate as catalysts for the amination reaction. More recently, copper barium chromite catalysts have been employed in U.S. Pat. No. 3,366,687 to Ellis et al. and U.S. Pat. No. 4,138,437 to Strauss et al., while supported copper oxide catalysts have been used in German application No. 2,709,864, U.S. Pat. No. 4,206,150 to Slaugh and U.S. Pat. No. 4,251,465 to Swift et al. Nickel is supplied in the form of Raney nickel in U.S. Pat. No. 2,953,601 to Whitaker, U.S. Pat. No. 3,152,185 to Zvienieka, and U.S. Pat. No. 3,223,734 to Fallstad et al. A nickel-copper-chromia catalyst has been used in U.S. Pat. No. 3,390,184 to Moss et al. In U.S. Pat. No. 4,152,353 Habermann discloses a process employing a catalyst comprising, on an oxide-free basis, 20 to 29 mol percent nickel, 36 to 79 mol percent copper and one to 15 mol percent of a third component selected from iron, zinc, zirconium and mixtures thereof.

Each of the catalysts in the above references exhibited relatively poor activity in the liquid phase amination processes described therein. By "liquid phase" we mean an amination process wherein the alcohol or the aldehyde is in the liquid phase and the ammonia or the primary or secondary amines are in the liquid or gaseous phase under the reaction conditions, defined hereinafter. Thus, large amounts of catalyst, high pressure and/or high temperature are required to achieve reasonable reaction rates. High temperatures and/or high pressures, however, tend to reduce the yield of desired product, while large amounts of catalysts involve higher costs, make filtration more difficult and give rise to additional problems associated with the disposal of spent catalyst. In each of U.S. Pat. Nos. 4,210,605 to Hishino et al. and 4,254,060 to Kimura et al., there is described a homogeneous colloidal catalyst system based on compounds of copper, nickel and barium which are highly active. Although highly active, these catalysts have certain disadvantages. For example, they are highly sensitive to poisons in the feed, and the ligands used can form by-products which can contaminate the amine product. Since these systems are homogeneous, that is, they are colloidally dispersed in the reaction system, they cannot be separated from the reaction product by filtration, but are recovered along with the heavy by-products when the desired amine product is distilled overhead. The number of useful catalyst cycles is therefore limited by the build-up of the associated heavies in the reactor. When the heavy fraction is finally recovered, it is contaminated with the catalyst in colloidal form.

SUMMARY OF THE INVENTION

We have found, unexpectedly, that an unsupported catalyst system consisting essentially of selected critical amounts of (1) copper oxide or copper hydroxide, (2) nickel oxide or nickel hydroxide and, optionally, (3) at least one oxide or hydroxide of a Group II A metal (magnesium, calcium, strontium and barium) is much more active in the liquid phase amination of aliphatic alcohols or aliphatic aldehydes with ammonia, a primary amine or a secondary amine than are the copper-chromium mixed oxides and supported copper oxides of the prior art. Since the major components of the catalyst system used herein are not colloidal, they can therefore easily be separated by filtration from the reaction product. The disadvantages associated with the catalyst systems of U.S. Pat. Nos. 4,210,605 and 4,254,060, referred to above, are significantly reduced.

The primary alcohol that is aminated herein can be defined by the following:

and the aldehyde by the following:

wherein R' is a linear or branched, saturated or unsaturated aliphatic group having from seven to 23 carbon atoms, preferably from seven to 17 carbon atoms.

The ammonia or primary or secondary amine that is reacted with above alcohol or aldehyde herein can be defined by the following:

wherein R" and R'", the same or different, can be hydrogen or a linear or branched, saturated or unsaturated aliphatic group having from one to 24 carbon atoms, preferably from one to 18 carbon atoms.

The amines that are formed herein can be defined by the following:

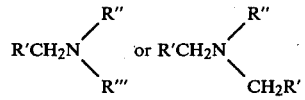

wherein R', R" and R'" are as defined above.

Examples of aliphatic alcohols that can be used herein include 1-octanol, 1-decanol, 1-dodecanol, 1-tetradecanol, 1-hexadecanol, 1-octadecanol, 2-ethyl-1-hexanol, oleyl alcohol, 1-nonanol and mixtures thereof. Examples of aliphatic aldehydes that can be used herein include: 1-octanal, 1-decanal, 1-dodecanal, 1-tetradecanal, 1-hexadecanal, 1-octadecanal, 2-ethylhexanol, oleyl aldehyde, 1-nonanal and mixtures thereof.

Primary amines that can be used herein include monomethylamine, monoethylamine, dodecylamine, hexadecylamine, 2-ethylhexylamine and mixtures thereof. Secondary amines that can be used herein include dimethylamine, diethylamine, dodecylmethylamine, dioctylamine and mixtures thereof.

Amines that can be prepared herein include dodecyldimethylamine, dodecylmonomethylamine, didodecylmethylamine, didodecylamine, 2-ethylhexyldimethylamine, oleyldimethylamine, tetradecyldimethylamine, hexadecyldimethylamine and octadecyldimethylamine.

For the reaction herein the alcohol and ammonia or primary or secondary amines can be used in varying amounts, although, in general, approximately stoichiometric amounts of each are used. In a preferred embodiment the ammonia or primary or secondary amines are used in slight excess.

The process defined herein is carried out in the contact presence of an unsupported catalyst consisting essentially of selected critical amounts of (1) copper oxide or copper hydroxide, (2) nickel oxide or nickel hydroxide and, optionally, (3) an oxide or a hydroxide of a Group II A metal. By "copper oxide" and "copper hydroxide" we mean to include cuprous oxide alone, cuprous hydroxide alone, cupric oxide alone, cupric hydroxide alone or any combination thereof.

The catalyst system used herein is either a physical mixture or composite of the compounds defined above wherein the nickel to copper atomic range is from about 0.005:1 to about 0.5:1, preferably from about 0.05:1 to about 0.35:1. When the oxide or hydroxide of a Group II A metal is used to further increase the activity of the catalyst, its atomic ratio to copper can be in the range up to about 3:1, but preferably in the range of about 0.25:1 to about 1.5:1.

The above catalyst system can be prepared most advantageously simply by physical admixture of the above components in the defined critical amounts. If desired, the catalyst system can be prepared by precipitating one or more of the components from solution. Thus, in a preferred method, the defined hydroxides can be co-precipitated from a water solution by dissolving a water-soluble salt of the metals, for example, copper nitrate, nickel nitrate and magnesium nitrate, in water, adjusting the pH thereof with a suitable base, such as sodium hydroxide or potassium hydroxide, to a pH of about 7 to about 12, resulting in the precipitation of the corresponding metal hydroxides. After filtering, the recovered metal hydroxides can be washed with water to obtain a highly active catalyst mixture. If desired, for example, for ease of handling, the catalysts can be oven-dried at a temperature of about 80° to about 200° C. for about one to about 48 hours. Alternatively, the catalyst can be spray-dried at much higher temperatures. If desired the resulting product can be subjected to calcination temperatures of about 200° to about 500° C. for about one to about 24 hours.

The process is simply effected by bringing together the reactants and the catalyst system defined above, while stirring, at a temperature of about 150° to about 300° C., preferably about 175° to about 250° C. while maintaining an absolute pressure of about one to about 100 atmospheres, preferably about one to about 10 atmospheres, most preferably about one to about two atmospheres. The total amount of catalyst needed is exceedingly small, for example, in the range of about 0.1 to about two grams, preferably about 0.25 to about one gram, per 100 grams of alcohol or aldehyde charged. Amounts in excess of about two weight percent of catalyst can be used, if desired, to further increase reaction rates. Before using the catalyst herein, it is activated by reducing with hydrogen, preferably while it is dispersed within the reactant alcohol or aldehyde. This can be done, for example, by passing hydrogen therethrough while maintaining a temperature of about 100° to about 200° C. over a period of about 15 minutes to about one hour at atmospheric pressure.

In a preferred embodiment of the process defined and claimed herein, the liquid alcohol or liquid aldehyde is charged to a stirred reaction vessel along with the desired catalyst mixture, after which the reaction vessel is purged with an inert gas, such as nitrogen. Then as the reaction vessel is heated to reaction temperature, the catalyst is activated by bubbling hydrogen into and through the liquid phase. When the desired reaction temperature has been reached, for example, in the range of about 150° to about 300° C., and the catalyst has been activated, a gas stream containing hydrogen and the reactant amine is passed through the reaction mixture. The off-gases, comprising hydrogen, unreacted amine, water of reaction and traces of unreacted alcohol or aldehyde and traces of product amine, are continuously removed from the reaction zone. The off-gases are cooled to separate water, and an organic phase which is returned to the reactor. If desired the off-gases can also be recycled to the reaction zone. This is continued until the conversion of alcohol or aldehyde is substantially complete. The product amine can be purified by vacuum distillation. In a preferred embodiment, however, since the catalyst for the most part is heterogeneous the reaction product is subjected to filtration to remove catalyst therefrom. The resulting filtrate is then subjected to distillation to recover the desired product amine. The catalyst can be recycled and the bottoms, after distillation, will be substantially catalyst-free.

DESCRIPTION OF PREFERRED EMBODIMENTS

Examples I to IV

Several supported copper oxide catalysts and a copper chromite catalyst were evaluated for the production of dodecyldimethylamine from dimethylamine and 1-dodecanol using the following procedure:

A weighed amount of powdered catalyst and 100 grams of 1-dodecanol were charged to an indented round-bottom, 500-milliliter flask equipped with a heating mantle, a magnetic stirrer, a gas sparging tube, a water-cooled condenser and a Dean-Stark trap to remove water produced in the reaction and return the organic phase to the flask. In Example I silica gel was impregnated with an aqueous solution of $Cu(NO_3)_2 \cdot 3H_2O$ and $KNO_3$. The resulting catalyst was oven-dried overnight at 120° C. and then calcined for one hour at 400° C. The catalyst of Example II was prepared as in Example I except that $Ni(NO_3)_2 \cdot 6H_2O$ was also present during the impregnation step. In Example III, PCB carbon (an activated carbon sold by Pittsburgh Carbon Co., Pittsburgh, Pa.) was impregnated with an aqueous solution of $Cu(NO_3)_2 \cdot 3H_2O$, oven-dried overnight at 120° C. and then calcined for one hour at 400° C. The copper-chromite catalyst used in Example IV was purchased.

Nitrogen was then bubbled into the flask over a period of about 15 minutes while the contents thereof were being heated to 100° C. The nitrogen was then replaced by hydrogen flowing at a rate of 1345 millimols per hour over a period of 40 to 60 minutes while the contents of the flask were raised to 210° C. During this period the catalyst was activated. At 210° C. the hydrogen flow was reduced to 811 millimols per hour, and dimethylamine was passed through the contents of the flask at a flow rate of 1560 millimols per hour. The reaction was carried out at atmospheric pressure. Hourly samples of the reaction product were analyzed by gas liquid chromatography. When the alcohol conversion exceeded 99 percent or the run was otherwise terminated, the flask was purged with nitrogen and allowed to cool to ambient temperature. The final product was filtered to remove substantially all of the catalyst, and the filtrate was distilled to separate the dodecyldimethylamine fraction from heavy by-products, such as didodecylmethylamine. The distillate, consisting essentially of dodecyldimethylamine, was analyzed by gas liquid chromatography and titrated to confirm tertiary and secondary amine content.

The results obtained are tabulated below in Table I. The quantities reported therein are defined as follows:

$$\text{Weight Percent Catalyst} = \frac{\text{Weight of Catalyst Charged}}{\text{Weight of Alcohol Charged}} \times 100$$

$$\text{Conversion} = \frac{\text{Mols of Alcohol Reacted}}{\text{Mols of Alcohol Charged}} \times 100$$

$$\text{Catalyst Activity} = \frac{10}{\text{Wt \% Catalyst} \times \text{Hours for 99\% conversion}}$$

$$\text{Wt \% Distillate} = \frac{\text{Wt of Product Recovered as Distillate}}{\text{Total Weight of Product}} \times 100$$

$$\text{Percent Yield} = \frac{\text{Wt \% Distillate} \times \text{Wt \% Alkyldimethylamine in the Distillate}}{100}$$

TABLE I

| Ex. No. | Catalyst | Wt % Catalyst | Hrs. for 99% Alcohol Conversion | Catalyst Activity | Wt % Distillate | Distillate Purity, Wt % RMe$_2$N* | RMeNH** | % Yield |
|---|---|---|---|---|---|---|---|---|
| I | 22% CuO + 1.2% K$_2$O on SiO$_2$ | 5.0 | 7.9 | 0.25 | 92.5 | 98.2 | 0.9 | 90.8 |
| II | 22% CuO + 1.2% K$_2$O + 1.2% NiO$_2$ on SiO$_2$ | 2.0 | 92% Conversion after 13 hours | | | | | |
| III | 22% CuO on Activated Carbon | 5.0 | 17% Conversion after 6 hours | | | | | |
| IV | 51% CuO + 47% Cr$_2$O$_3$ | 5.0 | 10.6 | 0.47 | 55.1 | 95.6 | 0.6 | 52.7 |

*Dodecyldimethylamine
**Dodecylmonomethylamine

From the above it can be seen that large amounts of supported copper oxides or copper chromite catalyst are required to achieve 99 percent conversion in under six hours. This should be contrasted with the examples below.

Examples V to XI

Each of Examples V to XI below was run following the procedure employed above in Examples I to IV, except that unsupported CuO alone or physical mixtures of CuO, Ni(OH)$_2$ and Ba(OH)$_2$ were used. The data obtained are tabulated below in Table II.

TABLE II

| Ex. No. | Alcohol Feed | Grams of Catalyst Charged per 100 Grams of Alcohol | | | Atomic Ratio | | Hrs. for 99% Alcohol conversion | Catalyst Activity | Wt % Distillate | Distillate Purity, Wt % | | % Yield |
| | | CuO | Ni(OH)$_2$ | Ba(OH)$_2$ | Ni/Cu | Ba/Cu | | | | RMe$_2$N* | RMeNH** | |
|---|---|---|---|---|---|---|---|---|---|---|---|---|
| V | 1-dodecanol | 2.0 | — | — | — | — | 5.5 | 0.8 | 81.0 | 94.8 | 2.0 | 76.8 |
| VI | 1-dodecanol | 0.25 | 0.05 | 0.25 | 0.17 | 0.5 | 6.5 | 2.8 | 92.2 | 97.2 | 0.3 | 89.6 |
| VII | 1-decanol | 1.0 | — | — | — | — | 10.2 | 1.0 | 88.4 | 94.4 | 0.9 | 83.4 |
| VIII | 1-decanol | 1.0 | 0.10 | 1.0 | 0.09 | 0.5 | 2.1 | 2.3 | 93.9 | 97.3 | 0.3 | 91.4 |
| IX | 1-decanol | 0.5 | 0.10 | 0.5 | 0.17 | 0.5 | 3.3 | 2.8 | 92.4 | 96.8 | 0.3 | 89.4 |
| X | 1-decanol | 0.25 | 0.10 | 0.25 | 0.34 | 0.5 | 4.8 | 3.5 | 93.7 | 97.6 | 0.2 | 91.5 |
| XI | 1-decanol | 0.25 | 0.20 | 0.25 | 0.7 | 0.5 | 8.9 | 1.6 | 85.1 | 95.4 | 2.4 | 81.2 |

*Dodecyldimethylamine in Examples V and VI; Decyldimethylamine in Examples VII to XI
**Dodecylmonomethylamine in Examples V and VI; Decylmonomethylamine in Examples VII to XI The data in Table II are unexpected. In each of Examples V and VII, wherein CuO alone was used, catalyst activity was surprisingly higher than that obtained in Table I. Comparing Example VI with Example V it can be seen that the mere addition of a selected amount of Ni(OH)$_2$ and Ba(OH)$_2$ to CuO greatly increases catalytic activity, enabling one to significantly reduce the amount of catalyst required. The amount of distillate recovered, product purity and yield were also significantly increased. Comparison of Examples VIII to X with Example VII show the same trend. When too much nickel is added, as in Example XI, catalyst activity and selectivity decreased.

Examples XII to XXVI

A series of copper/nickel oxide catalysts were prepared as follows:

Fifty grams of Cu(NO$_3$)$_2$·3H$_2$O and a stoichiometric amount of Ni(NO$_3$)$_2$·6H$_2$O were dissolved in 200 milliliters of distilled water. The solution was stirred and its pH adjusted to 10 by the slow addition of 10 weight percent sodium hydroxide solution. A precipitate formed, which was recovered by filtering the solution through a medium porosity fritted glass filter funnel. The filter cake was washed in the filter funnel with 200 milliliters of distilled water, then air dried by drawing air through the filter for 15 minutes. The filter cake was then removed from the funnel and dried in an oven at 120° C. overnight.

Copper-magnesium-nickel coprecipitates were also prepared using the above procedure, except that 25 grams of $Cu(NO_3)_2.3H_2O$, and 25 grams of $Mg(NO_3)_2.6H_2O$ were used in place of the 50 grams of $Cu(NO_3)_2.3H_2O$.

Copper and nickel hydroxides were also prepared as above, starting with 50 grams of $Cu(NO_3)_2.3H_2O$ or 50 grams of $Ni(NO_3)_2.6H_2O$. The cupric hydroxide was converted to cupric oxide in the oven-drying step.

A series of runs was carried out using the above catalysts following the procedure of Examples V and VI. The data obtained are tabulated below in Table III.

Example XXVII

One gram of the same Cu-Ni-Mg co-precipitated catalyst used in Examples XXV and XXVI, 50 grams of 1-dodecanol and 50 grams of dodecylamine were charged to the same reactor used in the previous examples. The reaction flask was purged with nitrogen, and the nitrogen was replaced with hydrogen flowing at 1345 millimols per hour and heated. When the reaction temperature reached 210° C. the hydrogen rate was reduced to 811 millimols per hour. After four hours, 99 percent of the dodecylamine and 95 percent of the dodecyl alcohol had been converted. The final product contained 90 percent by weight didodecylamine. This example shows that long-chain amines can also be used as a feedstock in the process of this invention and that amines of the type RR'NH can be produced in high yields.

TABLE III

| Ex. No. | Atomic Ratio Cu | Ni | Mg | Wt % Catalyst | Hrs. for 99% Alcohol Conversion | Catalyst Activity | Wt % Distillate | Distillate Purity, Wt % RNMe₂* | RMeNH** | % Yield |
|---|---|---|---|---|---|---|---|---|---|---|
| XII | 1.0 | — | — | 2.0 | 3.8 | 1.3 | 74.6 | 95.8 | 0.4 | 71.5 |
| XIII | 1.0 | 0.003 | — | 2.0 | Reaction stopped due to foaming | | | | | |
| XIV | 1.0 | 0.008 | — | 2.0 | 4.7 | 1.1 | 88.8 | 96.4 | 0.4 | 85.6 |
| XV | 1.0 | 0.033 | — | 2.0 | 1.8 | 2.8 | 95.2 | 97.4 | 0.5 | 92.7 |
| XVI | 1.0 | 0.033 | — | 0.50 | 5.3 | 3.8 | 93.6 | 96.9 | 0.4 | 90.7 |
| XVII | 1.0 | 0.083 | — | 0.50 | 3.8 | 5.3 | 94.9 | 96.8 | 0.4 | 91.9 |
| XVIII | 1.0 | 0.083 | — | 0.25 | 10.0 | 4.0 | 95.6 | 97.4 | 0.4 | 93.1 |
| XIX | 1.0 | 0.166 | — | 0.50 | 4.9 | 4.1 | 95.4 | 96.6 | 0.4 | 92.2 |
| XX | 1.0 | 0.166 | — | 0.25 | 6.7 | 5.9 | 91.9 | 97.3 | 0.4 | 89.4 |
| XXI | 1.0 | 0.250 | — | 0.50 | 7.0 | 2.9 | 93.8 | 96.3 | 0.4 | 90.3 |
| XXII | — | 1.0 | — | 1.0 | Very little reaction | | | | | |
| XXIII | 1.0 | 0.083 | 1.0 | 2.0 | 1.9 | 2.6 | 87.7 | 96.8 | 0.7 | 85.0 |
| XXIV | 1.0 | 0.083 | 1.0 | 0.50 | 3.3 | 6.1 | 91.9 | 96.7 | 0.5 | 88.9 |
| XXV | 1.0 | 0.166 | 1.0 | 0.50 | 3.3 | 6.1 | 94.1 | 97.2 | 0.5 | 91.5 |
| XXVI | 1.0 | 0.166 | 1.0 | 0.25 | 7.0 | 5.7 | 95.2 | 96.9 | 0.4 | 92.2 |

*Dodecyldimethylamine
**Dodecylmonomethylamine

The uniqueness of the novel process defined and claimed herein is further apparent from the data in Table III. Thus, even though cupric oxide alone in Example XII was quite active in comparison with the catalysts used in Table I, the addition of a selected amount of the nickel compound in Examples XIV to XXI greatly increased catalyst activity, the amount of distillate obtained, the distillate purity and tertiary amine yield. Even when the total amount of catalyst was significantly reduced, the reaction was completed in a shorter time. This is surprising in light of Example XXII wherein nickel oxide alone exhibited substantially no catalytic activity. The presence of a Group II A metal oxide in the catalyst system further increased the catalytic activity of the catalyst herein, as shown in Examples XXIII to XXVI. Thus, if one compares Example XXIV with Example XVII, and Example XXV with Example XIX, it can be seen that while catalyst activity based on the total weight of catalyst remains substantially the same, catalyst activity based on the total weight of copper and nickel present is substantially higher. We have further observed in our work that the presence of a Group II A metal oxide in the catalyst system stabilizes the catalyst, in that it inhibits the agglomeration of the copper entity into larger particles of copper. This means that the catalytic activity of the copper is maintained for longer periods of time when the Group II A metal oxide is present.

Example XXVIII

Example XXV was repeated except that ammonia was used instead of dimethylamine, the ammonia flow rate was 330 millimols per hour and one gram of catalyst was charged. After six hours the reaction had essentially stopped. The final product contained 2.5 percent dodecylamine, 0.4 percent 1-dodecanol, 86.5 percent didodecylamine and 5.5 percent heavier products. This shows that ammonia reacts with an aliphatic alcohol to give a high yield of dialkylamines in the process of this invention.

Example XXIX

To demonstrate the production of dialkylmethylamines from monomethylamine and fatty alcohols, Example XXVII was repeated except that the reactants were monomethylamine flowing at a rate of 520 millimols per hour and 1-decanol. The product obtained after four hours contained 1.7 percent 1-decanol, 24 percent decylmethylamine and 53 percent didecylmethylamine and 18 percent heavier materials by weight.

Obviously, many modifications and variations of the invention, as hereinabove set forth, can be made without departing from the spirit and scope thereof, and therefore only such limitations should be imposed as are indicated in the appended claims.

We claim:

1. A process for producing amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide and (2) nickel oxide or nickel hydroxide.

2. The process of claim 1 wherein said aminating agent is ammonia.

3. The process of claim 1 wherein said aminating agent is a primary amine.

4. The process of claim 1 wherein said aminating agent is a secondary amine.

5. The process of claim 3 wherein said primary amine is monomethylamine.

6. The process of claim 3 wherein said primary amine is dodecylamine.

7. The process of claim 4 wherein said secondary amine is dimethylamine.

8. The process of claim 1 wherein an aliphatic aldehyde is reacted with said aminating agent.

9. The process of claim 1 wherein an aliphatic alcohol is reacted with said aminating agent.

10. The process of claim 9 wherein said aliphatic alcohol is 1-dodecanol.

11. The process of claim 9 wherein said aliphtic alcohol is 1-decanol.

12. The process of claim 1 wherein the nickel to copper atomic ratio is in the range of about 0.005:1 to about 0.5:1.

13. The process of claim 1 wherein the nickel to copper atomic ratio is in the range of about 0.05:1 to about 0.35:1.

14. A process for producing amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide, (2) nickel oxide or nickel hydroxide, and (3) an oxide or a hydroxide of a Group IIA metal.

15. The process of claim 14 wherein said Group II A metal is magnesium.

16. The process of claim 14 wherein said Group II A metal is barium.

17. The process of claim 14 wherein the atomic ratio of said Group II A metal to copper is up to about 3:1.

18. The process of claim 14 wherein the atomic ratio of said Group II A metal to copper is in the range of about 0.25:1 to about 1.5:1.

19. The process of claim 14 wherein the nickel to copper atomic ratio is in the range of about 0.005:1 to about 0.5:1 and the Group II A metal to copper atomic ratio is up to about 3:1.

20. The process of claim 14 wherein the nickel to copper atomic ratio is in the range of about 0.05:1 to about 0.35:1 and the Group II A metal to copper atomic ratio is in the range of about 0.25:1 to about 1.5:1.

21. The process of claim 19 wherein said Group II A metal is magnesium.

22. The process of claim 19 wherein said Group II A metal is barium.

23. The process of claim 20 wherein said Group II A metal is magnesium.

24. The process of claim 20 wherein said Group II A metal is barium.

25. The process of claim 1 wherein the amount of catalyst is in the range of about 0.1 to about two weight percent.

26. The process of claim 1 wherein the amount of catalyst is in the range of about 0.25 to about one weight percent.

27. The process of claim 1 wherein 1-decanol is reacted with dimethylamine.

28. The process of claim 1 wherein 1-dodecanol is reacted with dimethylamine.

29. The process of claim 1 wherein 1-decanol is reacted with dodecylamine.

30. The process of claim 1 wherein 1-decanol is reacted with ammonia.

31. The process of claim 1 wherein 1-decanol is reacted with monomethylamine.

32. The process of claim 14 wherein said catalyst consists essentially of CuO, $Ni(OH)_2$ and $Ba(OH)_2$.

33. The process of claim 1 wherein said catalyst consists essentially of CuO and $Ni(OH)_2$.

34. The process of claim 14 wherein said catalyst consists essentially of CuO, $Ni(OH)_2$ and MgO.

35. The process of claim 1 wherein the reaction temperature is in the range of about 150° to about 300° C. and the pressure is in the range of about one to about 100 atmospheres.

36. The process of claim 1 wherein the reaction temperature is in the range of about 175° to about 250° C. and the pressure is in the range of about one to about 10 atmospheres.

37. The process of claim 1 wherein the reaction temperature is in the range of about 175° to about 250° C. and the pressure is in the range of about one to about two atmospheres.

38. The process of claim 1 wherein the reaction product is filtered to remove solid catalyst therefrom and an alkyldimethyl amine is recovered from the filtrate.

39. The process of claim 1 wherein water of reaction is continuously removed from the reaction zone.

* * * * *